United States Patent Office 2,773,068
Patented Dec. 4, 1956

2,773,068

SUBSTITUTION DERIVATIVES OF IMIDAZOLINE ALKANOIC QUATERNARY AMMONIUM HYDROXIDE AND PROCESS OF PREPARING SAME

Hans S. Mannheimer, New York, N. Y.

No Drawing. Application July 11, 1955,
Serial No. 521,393

8 Claims. (Cl. 260—309.6)

This invention relates to novel compositions and to methods for producing them. In one of its more specific aspects the invention is directed to novel compounds which are different from and for certain purposes are far better than the metal salts of substituted quaternary hydroxy cycloimidinic acid metal alcoholates, examples of which are disclosed in U. S. Patent 2,528,378 and which I shall hereinafter refer to herein as "cycloimidates."

Said "cycloimidates" have been found useful because they have high detergent, foaming, wetting, emulgating, emulsifying, dispersing, bacteriastatic, bacteriacidal, fungicidal, and deodorizing characteristics. They are highly water-soluble, stable in aqueous solutions in the pH range of 1–14 and are not precipitated out of solution by the salts normally present in hard water. They are non-vesicant and non-toxic to human and animal life and may be introduced into the blood stream without ill effects. They are surface active agents and serve as excellent synthetic detergents, softeners and dye assistants in the textile and related fields and especially in washing and cleansing of cotton fibers and textiles. They may also be employed as therapeutic agents and are especially useful as germicides, fungicides and antisepticides.

Said "cycloimidates" have the following general formula (I):

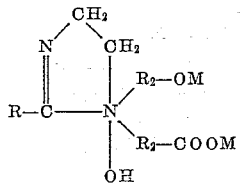

in which R is the organic radical which if connected to a carboxyl group provides a monocarboxylic acid and said radical contains at least 4 carbon atoms; $R_2$ is an aliphatic hydrocarbon group having 1 to 4 carbon atoms, such as —$CH_2$—, —$C_2H_4$—, —$C_3H_6$—, and —$C_4H_8$ or any of the aforesaid groups, any one or more of whose hydrogens may be hydroxy substituted, illustrative examples of which are —$CH_2$—CHOH—$CH_2$,

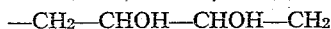

or any of the aforesaid groups either unsubstituted or hydroxy substituted and having ether (—O—) or keto (—CO—) linkage therein; illustrative examples of which are

—$C_2H_4$—O—$C_2H_4$—; —$CH_2$—CHOH—O—$C_2H_4$

—$CH_2$—CO—$CH_2$; both M radicals may be the same as or different from each other and each is a metal and preferably an alkali metal and for most purposes is sodium or potassium.

The methods for producing said "cycloimidates" and illustrative examples of a number of specific "cycloimidates" are disclosed in said patent.

One of the methods disclosed in said patent for the production of said "cycloimidates" is to first produce a cycloimidine by reacting one mole of a moncarboxylic acid, having at least 4 and preferably 4-18 carbon atoms in its radical connected to its COOH group, with one mole of aminoethylethanolamine, known in said patent and herein as Reactant A. Then one mole of said cycloimidine is reacted with one mole of a monohalocarboxylic acid in the presence of a fixed proportion of caustic soda all described in said patent to produce said "cycloimidates." Such "cycloimidates" are produced because of the marked preferential of the reactants and because of the mole proportion of reacants being one to one, in the presence of the caustic.

In the course of my extensive experimentations with said "cycloimidates" I have discovered that under certain controlled conditions said "cycloimidates" may be reacted with said monohalocarboxylic acids to replace the metallic element M of the $R_2$—OM group thereof with an $R_3$—COOM group, in which the definition of $R_3$ is the same as $R_2$ hereinbefore defined to provide compounds of the following general formula (II);

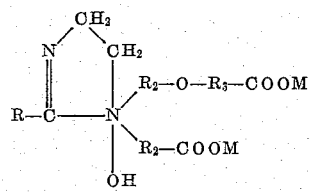

Still another method which may be employed to produce said novel compounds is to heat together at approximately 100° C. one mole proportion of said cycloimidine and an aqueous solution at a pH of about 13 produced by previously combining at a temperature no greater than 20° C. 2 moles of said monohalocarboxylic acid, having 1–4 carbon atoms in its hydrocarbon group, such as $CH_2$, $C_2H_4$, $C_3H_6$, $C_4H_8$, and approximately 4.5–5 moles of caustic soda. The mass is maintained at said temperature of approximately 100° C. until the pH thereof decreases to the range of approximately 8.8–9.3.

The novel compounds of this invention have unusual and totally unexpected properties.

I was surprised to discover that despite the increased anionic properties of these novel compounds when compared with said "cycloimidates," due to the presence of an additional COOM group, these novel compounds exhibited complete compatibility with cationic surface active agents and also with quaternary ammonium salt germicides. Such germicides are generally extremely sensitive to most other anionic compounds and when combined with most other anionic compounds lose their germicidal efficiency and form water insoluble compounds therewith.

I was further surprised to discover that these novel compounds were well soluble in hard water and also in water solutions of acids and other acidic agents.

These novel compounds when compared with the corresponding "cycloimidates" were found to have the startling and unexpected properties of very fast foaming and high lubricity making them particularly useful in the formulation of quick or flash foaming shampoos of high lubricity. Before this invention, the characteristics of high lubricity was associated with soaps and not synthetic detergents.

These novel compounds were found to have the even more startling and unexpected property of a minus skin irritation when tested interdermally on rabbits using the recoganized test procedure of the Federal Drug Administration. This minus skin irritation characteristic is especially significant when it is compared with that of castile soap which is plus 2, warm water which is plus 1 and said "cycloimidates" which is between plus 2 and plus 3.

The following are illustrative examples given merely for the purposes of specifically illustrating how some of the compounds of the present invention may be produced, all parts being given by weight unless otherwise specified:

Example 1

200 parts of lauric acid and 104 parts of Reactant A are placed in a reacting vessel and are heated sufficiently to melt the lauric acid whereupon an agitator located therein is started and mixes and maintains these components in mixed condition. While being constantly agitated the mix is heated under vacuum of about 110 mm. pressure for about 3 hours while gradually raising the temperature to 170° C. During this period 18 parts of water have been distilled off. Then the temperature of the entire mass is gradually raised to 220° C. over a period of about 2 hours while the mercury pressure has been decreased to a value no greater than 30 mm. Under these conditions 18 more parts of water are distilled off leaving behind in the reaction mass a 100% pure product which is a disubstituted cycloimidine which is a light colored viscous liquid at room temperature. Then this reaction product is allowed to cool to room temperature and the entire mass is added to a previously prepared solution produced by adding 192 parts of monochloracetic acid and 180 parts of caustic soda to 600 parts of water. This solution was prepared and maintained at a temperature below 20° C. before the addition of said di-substituted cycloimidine. This mixture is heated to 100° C. and maintained at this temperature for 2 hours. During this period the pH of the mix is reduced from approximately 13 to 8.8–9.3. At the end of this period the pH of this mass is no longer subject to change by continued heating at said temperature and a sample of the resultant product is water soluble to a sparkling clear solution. At the end of this period the mass consists chiefly of a water solution of one of my novel products having the following formula:

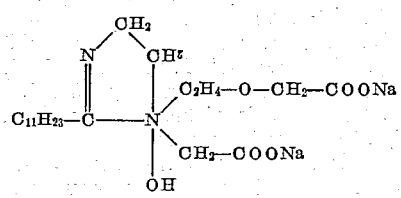

This compound at room temperature is a straw colored solid having exceptional cleansing and foaming properties of high stability which make it particularly useful in the cleansing of cotton. It has also been found useful as a dye assistant in the textile industry and in the cosmetic industry as a shampoo base and bubble bath product because of its lubricity and flash foaming properties.

Example 2

200 parts of lauric acid and 104 parts of Reactant A are placed in a reacting vessel and are heated sufficiently to melt the lauric acid whereupon an agitator located therein is started and mixes and maintains these components in mixed condition. While being constantly agitated the mix is heated under vacuum of about 110 mm. pressure for about 3 hours while gradually raising the temperature to 170° C. During this period 18 parts of water have been distilled off. Then the temperature of the entire mass is gradually raised to 220° C. over a period of about 2 hours while the mercury pressure has been decreased to a value no greater than 30 mm. Under these conditions 18 more parts of water are distilled off leaving behind in the reaction mass a 100% pure product which is a disubstituted cycloimidine which is a light colored viscous liquid at room temperature. Then this reaction product is allowed to cool to room temperature and the entire mass is added to a previously prepared solution produced by adding 96 parts of monochloracetic acid and 90 parts of caustic soda to 300 parts of water. This solution was prepared and maintained at a temperature below 20° C. before the addition of said di-substituted cycloimidine. This mixture is heated to 95° C. and maintained at this temperature for 2 hours. During this period the pH of the mix is reduced from approximately 13 to 8–8.5. At the end of this period the pH of this mass is no longer subject to change by continued heating at said temperature and a sample of the resulting product is water soluble to a sparkling clear solution which clouds upon standing. Then to said reaction mass there is added 25 additional parts of caustic soda dissolved in 21 parts of water and heating is continued to maintain said mass at about 95° C. for an additional 1 hour.

At the end of that period said mass, known as Mass X, is cooled to room temperature and then there is added thereto a previously prepared solution produced by adding 96 parts of monochloracetic acid and 80 parts of caustic soda into 300 parts of water while maintaining same at a temperature no greater than 20° C. and preferably at about 15° C. The resultant mixture of said mass and said solution is then heated to and maintained at about 100° C. for about 1–2 hours. In that period, the pH of the resultant product will have been reduced from approximately 13, that of the original mixture, to approximately 8.8–9.3. Then the resultant product is cooled to room temperature and consists chiefly of an aqueous solution of a novel reaction product, identical with that of Example 1, with the amount of water in said solution being slightly greater than that of the solution thereof in Example 1.

Example 3

All of Mass X of Example 2 may be cooled to room temperature and there is then added thereto a solution consisting of 40 parts of caustic soda dissolved in 40 parts of water. Then to said mixture there are added 80.5 parts of chlorhydrin. This mixture is heated over a period of 1 hour to 95° C. The mass is subsequently maintained at this temperature of 95° C. until there is no change in pH, this taking approximately 2 to 3 hours.

The resultant mass is then cooled to room temperature and mixed with a previously prepared solution produced by changing 96 parts of monochloracetic acid and 80 parts of caustic soda into 300 parts of water while being maintained at about 15° C. The mixture is then heated to and maintained at about 100° C. for 1–2 hours. At the end of this period the mass consists chiefly of an aqueous solution of one of my novel compounds having the following formula:

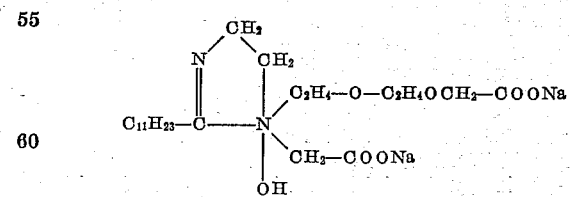

Example 3A 172 parts of capric acid and 104 parts of Reactant A are heated and reacted under the same condition as given in Example 1, and 240 parts of the di-substituted cycloimidine produced thereby are introduced into a solution of 220 parts of monochlorpropionic acid and 190 parts of caustic soda in 500 parts of water prepared and maintained below 20° C. The resulting mixture is then heated under the same conditions as outlined in Example 1 until the resulting product forms sparkling clear aqueous solutions and is no longer subject to pH change in continued heating. The mass consists chiefly of an aqueous solution of one of my novel products having the following formula, and is particularly suitable for increasing the flash foam of shampoo.

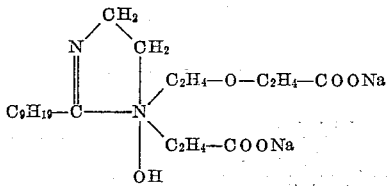

*Example 4*

282 parts linseed fatty acid and 104 parts Reactant A are treated in the same manner as described in Example 1. The entire reaction product is then processed with an aqueous solution of 192 parts monochloracetic acid and 180 parts of caustic soda previously made and maintained below 20° C. and subsequently processed in the manner of Example 1 to produce reaction product having the same formula as that of Example 1 except that $C_{17}H_{31}$ is substituted for $C_{11}H_{23}$ therein.

*Example 5*

116 parts of caproic acid and 104 parts of Reactant A are condensed in the manner as described in the previous examples and the resulting reaction product is subsequently processed in the same manner as that set forth in the processing of the di-substituted cycloimidine of Example 4. The reaction product has the same formula as that of Example 1 except that $C_5H_9$ is substituted for $C_{11}H_{23}$ therein.

*Example 6*

284 parts of stearic acid and 104 parts of Reactant A are heated in the like manner as described in previous examples, and the resulting reaction product is then introduced into an aqueous solution of 220 parts monochlorpropionic acid and 190 parts of caustic soda. The process is carried out in the same manner as described in the previous Example 1 and there is produced a product having the same formula as that of Example 3A, except that $C_{17}H_{35}$ is substituted for $C_9H_{19}$ therein.

*Example 7*

290 parts dodecyl benzoic acid and 104 parts of Reactant A are condensed in the manner described in Example 4 and the resultant product is processed in the manner of Example 4 wherein there is produced a novel compound having the same formula as that of Example 1, except that $C_{12}H_{25}C_6H_4$ is substituted for $C_{11}H_{23}$ therein.

*Example 8*

228 parts of myristic acid and 104 parts Reactant A are reacted in the manner described in Example 4 and the resultant product is processed in the manner of Example 4 whereby there is produced a novel compound having the same formula as that of Example 1, except that $C_{13}H_{27}$ is substituted for $C_{11}H_{23}$ therein.

*Examples 9–13*

One mole proportion of the respective "cyclormidates" described in Examples 10–14 of said Patent 2,528,378 are mixed with aqueous solution prepared at 18° C. by the addition of 1 mole proportion of monochloracetic acid and about 2 moles proportion of caustic soda in about 30 moles of water and such mixtures are maintained at about 100° C. for approximately 2 hours whereupon the pH thereof decreases from 13 to about 8.8–9.3 to provide compounds which are the same as those of Examples 10–14 of said patent except that the sodium atom of the R—ONa groups thereof are replaced by —$CH_2$—COONa, and an illustrative example of this is such group of Example 10 having its sodium atom so replaced to become $CH_2CHOHCH_2OCH_2COONa$.

A large number of other specific compounds may be produced by using starting compounds other than those defined in any of the aforesaid examples and differing therefrom in the radical R. Also other specific compounds may be produced by using a monohalacarboxylic acid other than the specific ones employed in the aforesaid examples.

Since certain changes in carrying out the aforesaid processes and certain modifications in the compositions which embody the invention may be made without departing from its scope, it is intended that all matter contained in the description shall be interpreted as illustrative and not in a limiting sense.

I claim:
1. A compound of the following formula:

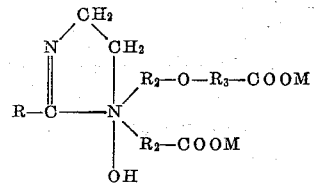

in which R is a hydrocarbon radical of 4 to 18 carbon atoms, $R_2$ and $R_3$ are selected from the group consisting of (a) aliphatic hydrocarbon groups of 1–4 carbon atoms, (b) hydroxy substituted aliphatic hydrocarbon groups of 1–4 carbon atoms, (c) aliphatic ether groups, each of said group having a single ether linkage therein and otherwise being hydrocarbon of 2–4 carbon atoms, (d) aliphatic ether groups, each of said groups having a single ether linkage therein and otherwise being hydroxy substituted hydrocarbon of 2–4 carbon atoms, (e) aliphatic keto groups, each of said groups having a single keto linkage therein and otherwise being hydrocarbon of 2–4 carbon atoms, (f) aliphatic keto groups, each of said groups having a single keto linkage therein and otherwise being hydroxy substituted hydrocarbon of 2–4 carbon atoms, and M is an alkali metal.

2. A novel compound having the following formula:

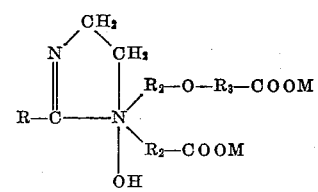

in which R is a hydrocarbon radical of 4–18 carbon atoms, $R_2$ and $R_3$ are aliphatic hydrocarbon groups of 1–4 carbon atoms and M is an alkali metal.

3. A novel compound having the following formula:

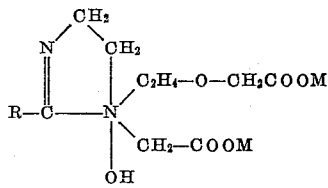

in which R is a hydrocarbon radical of 4–18 carbon atoms and M is an alkali metal.

4. A novel compound of the following formula:

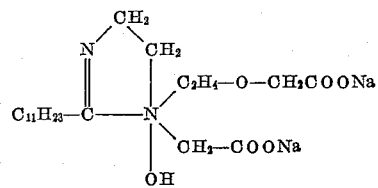

5. A novel compound of the following formula:

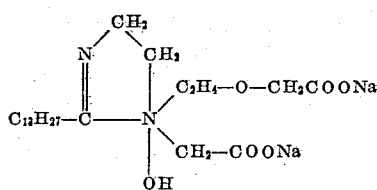

6. A novel compound of the following formula:

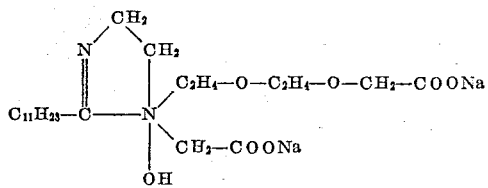

7. A novel compound of the following formula:

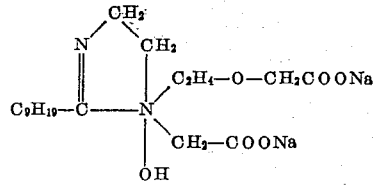

8. The method for preparing a compound defined in claim 3, comprising heating an aqueous solution one mole of a cycloimidine, 2 moles of a monohalomocarboxylic acid and at least approximately 4.5 moles of caustic soda, said heating continued until the pH of said solution is reduced from approximately 13 to the range of approximately 8.8 to 9.3 said cycloimidine produced by reacting a monocarboxylic acid having 4–18 carbon atoms in its radical connected to its COOH with one mole of aminoethylethanolamine.

References Cited in the file of this patent
UNITED STATES PATENTS
2,528,378   Mannheimer _____ Oct. 31, 1950